(No Model.)

G. E. MILLER.
ELECTRIC SIGNALING.

No. 545,904. Patented Sept. 10, 1895.

WITNESSES
W. H. Bentley.
G. T. Cunningham.

INVENTOR
George E. Miller
by
E. M. Bentley
atty.

UNITED STATES PATENT OFFICE.

GEORGE E. MILLER, OF STONEHAM, ASSIGNOR TO THE AMERICAN ELECTRIC TRAIN AND SWITCH SIGNAL COMPANY, OF BOSTON, MASSACHUSETTS.

ELECTRIC SIGNALING.

SPECIFICATION forming part of Letters Patent No. 545,904, dated September 10, 1895.

Application filed September 6, 1894. Serial No. 522,255. (No model.)

*To all whom it may concern:*

Be it known that I, GEORGE E. MILLER, a citizen of the United States, residing at Stoneham, county of Middlesex, State of Massachusetts, have invented a certain new and useful Improvement in Electric Signaling, of which the following is a specification.

This invention relates to an improvement in electric signaling as applied to railroad service, and has for its object to provide trustworthy, certain, and effective apparatus. It is particularly applicable to those systems employing an insulated sectional duplex conductor in constant connection with a source of electrical current—such as a generator or battery carried, preferably, upon each locomotive—and adapted to indicate to the engineer, by the closing of the circuit through an alarm-bell in the locomotive-cab, the dangerous proximity of another train or other objects capable of establishing electrical connection between rails and conductor or any danger from misplaced switches.

My invention consists in providing with each alternating-current generator automatic means for testing the condition of the apparatus, thereby furnishing positive and accurate information to the engineer in regard to the working order of the entire installation.

Figure 1:
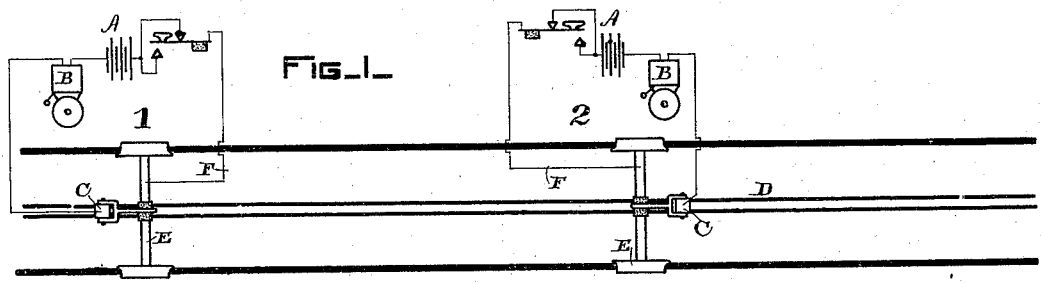
Figure 2:
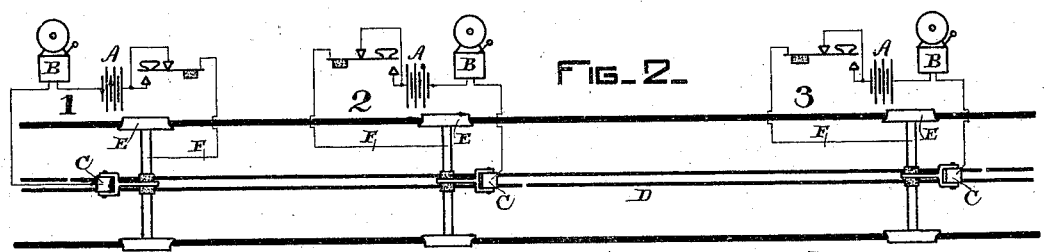
Figure 3:
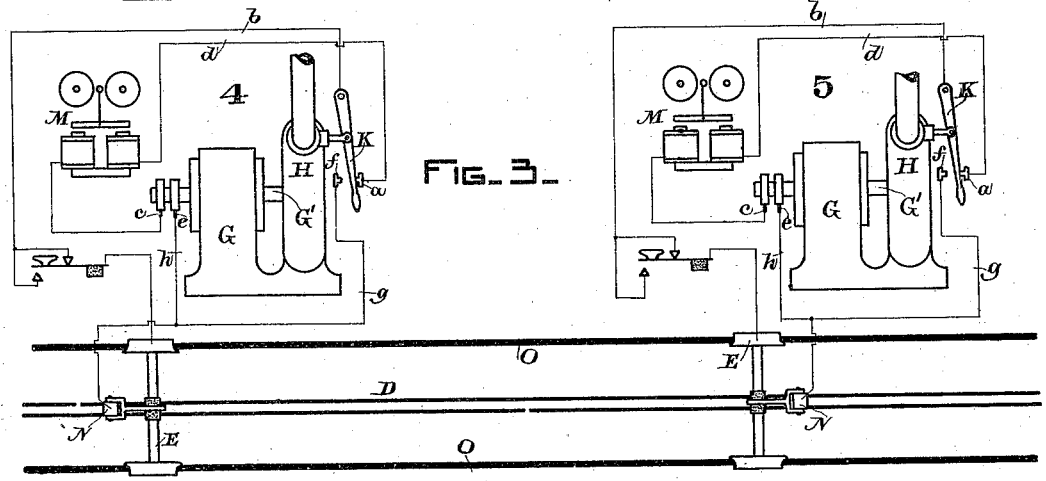
Figure 4:
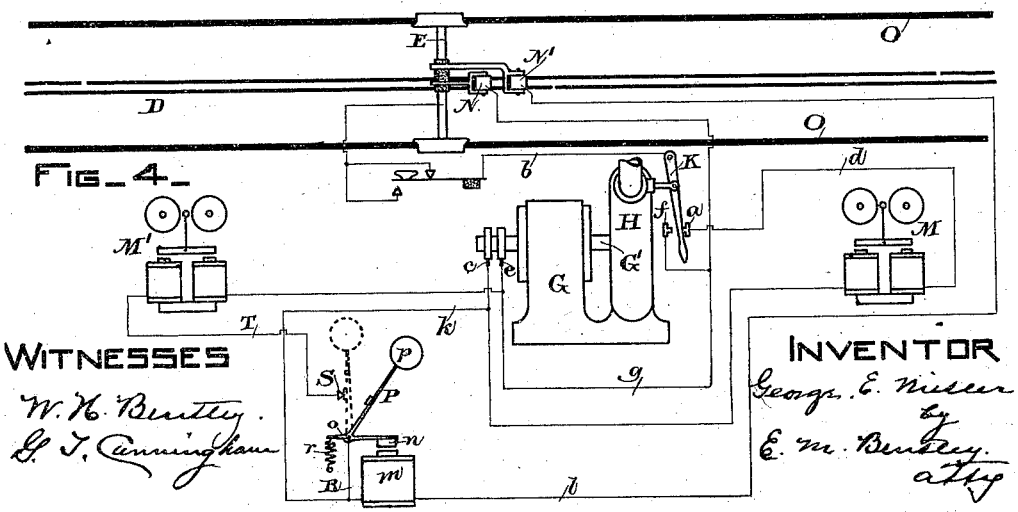

In the drawings which form a part of this specification, Figure 1 is a diagrammatic representation of two trains occupying the same section of a railway equipped with a duplex insulated sectional conductor extending along the track. Fig. 2 is the same as Fig. 1, with three trains on the same section. In these two figures the locomotives are represented as having batteries to supply current for operating the system. Fig. 3 is a diagrammatic illustration of a train equipped with an alternating-current dynamo, the dynamo and its motor being shown in elevation and the other train apparatus in plan. Fig. 4 is a plan view of the device for testing the condition of the apparatus.

Referring to Fig. 1, A is the battery. B is the alarm-bell; C, the contact device bearing on the conductor D, and E the locomotive-wheel, with wire F connecting it to the battery. These parts are the same on both locomotives and are similarly lettered. The positive terminal of each battery is shown connected to its respective contact device. It is apparent, therefore, that the two batteries oppose each other, and neither alarm-bell will sound, because no current flows through them. If, now, by means of a reversing-switch, (not shown,) the positive terminal of battery 1 is connected to the car-wheel and the negative to the contact device, the circuits of the two batteries will correspond and the alarm-bell will be rung in both cabs. There will therefore be a satisfactory operation of the system so far as these two trains are concerned.

In Fig. 2 a third train 3 is shown approaching 2 from the rear and on the same section with it. Since, like 2, the positive terminal of its battery is connected to the contact device, the same inoperative condition will prevail with relation to trains 2 and 3, as in the case of trains 1 and 2 before the battery of train 1 was reversed. There is therefore, for reasons already shown, no operation of the bell in cab 3, and train 3 might approach dangerously close to train 2, having received no warning of its proximity. If in this emergency a reversal of the battery on train 2 was to be resorted to, the battery of train 1 will again oppose that of train 2 and no protection be afforded either one.

In Fig. 3, G is an alternating-current dynamo whose armature-shaft $g'$ is continuous with the shaft of a rotary steam-turbine H, adapted to drive the dynamo G. These are preferably mounted on the locomotive in a suitable position. The lever K, controlling the steam-valve of the turbine, is included in the circuit when the dynamo is in operation, since it rests against the stop $a$ when the valve is opened, the conductor $b$ connecting it with the other terminal of the circuit, which in this case is the track-rail. The stop $a$ is connected to the brush $c$ by the conductor $d$, in which is included the polarized bell M. The other brush $e$ is connected with the contact device by conductor $h$. A second stop $f$ is connected to the contact device N by the conductor $g$. This same installation of apparatus is made on all locomotives on the road, and a duplication of it is seen at 5, which represents another train on the same section with train 4. With the two trains thus situated and the dynamo of each train in operation, the levers K rest against the stop $a$ and the circuit is completed from brush $c$, and its conductor to bell M, conductor $d$, stop $a$, lever K, conductor $b$ to rail O; then following the corresponding circuit on the other train, except in a reversed order to the contact device, conductor D back to the contact device, to the first generator, conductor $h$, and brush $e$. There is therefore a simultaneous sounding of the alarm-bell in each locomotive-cab. Should for any reason the dynamo of one train—say 5—be not in operation, the motor-lever K will rest against stop $f$, since that is its position when the valve is closed. The circuit in that event on that train will be from contact-brush N, conductor $g$, contact $f$, lever K, conductor $b$ to rail O, the circuit of apparatus of train 4 meanwhile remaining the same as before described when in operative condition. The proximity of train 5 to train 4 will therefore be indicated to train 4 by the sounding of the bell as usual. Trains 4 and 5 are assumed to be approaching each other on the same track. Should a third train (not shown) following train 4 enter the same section, its presence would be indicated to train 4 in the manner already described, for the high frequency of the alternations of the current of the dynamos make a permanent opposition practically impossible, and therefore under any conceivable position of trains the system is in constant operative condition.

A means for testing the condition of the circuit is shown in Fig. 4. The apparatus illustrated forms part of the equipment of every locomotive, and its relation to the apparatus already described and method of operation will now be pointed out. The main circuit of the dynamo G is the same as before described: from brush $c$ of the generator G to bell M, conductor $d$, stop $a$, lever K, conductor $b$ to the track-rail O, apparatus on another train, conductor D, contact device N, conductor $g$ to brush $e$. A shunt-circuit of high resistance starting from brush $c$, having conductors $k$ and $l$ and including the magnet $m$, is completed through the supplementary contact device N', conductor D, contact device N, conductor $g$, and brush $e$. The magnet $m$ has the armature $n$ pivoted at $o$ and carrying the upwardly-extending indicator-arm P, which is provided with a disk $p$. When dynamo G is in operation, the magnet $m$ holds armature $n$ in the position indicated in opposition to the spring $r$. A conductor R connects the brush $c$ with the armature $n$. The stop S is connected with the conductor T, leading to the brush $e$, and included in which is the polarized bell M'.

The operation is as follows: With the dynamo in operation the armature $n$ is held attracted by magnet $m$. If, now, the contact device N should fail to make electrical connection with the conductor D, the shunt-circuit would be broken and magnet $m$ be de-energized, the arm P under the action of the spring $r$ flying back against stop S. The circuit would then be closed through the polarized bell M', the current from brush $c$ traversing conductor R, armature $n$, stop S, conductor T, and bell M' to brush $e$. The normal or safety position of armature $n$ therefore is when it is held attracted by the magnet $m$, and so long as the main circuit is unbroken this position is maintained. Should, however, contact device N fail to keep in electrical connection with conductor D or the circuit through conductor $g$ be broken at any point from brush $e$ to contact device N, the indicator-arm P will assume a vertical position and the bell M' begin sounding, thus informing the engineer of the faulty condition of the apparatus. It is of course understood that the resistance of the magnet $m$ is greater than that of the main circuit; otherwise when the main circuit is closed by another train on the same section or in any other way no current would flow through it, and consequently alarm-bell M would not be sounded. If desired, a special resistance might be included in conductor $k$ to take the place of high-resistance coils in the magnet $m$.

What I claim as new, and desire to secure by Letters Patent, is—

1. In a signaling system for railways provided with a sectional conductor extending along the track, the combination with a train, of signaling apparatus in a main circuit operated by alternating currents, and means for automatically indicating the condition of said main circuit, comprising electrical apparatus in an open shunt circuit adapted to be closed when the main circuit is broken.

2. In a signaling system for railways provided with a sectional conductor extending along the track, the combination with an alternating current dynamo, carried by a train, supplying current to said conductor, the main circuit being closed through said conductor, rails, and the car wheels, of automatic means of testing the condition of the main circuit comprising a second circuit and electrical apparatus therein, and means for closing said second circuit when the main circuit is broken.

3. In a signaling system for railways provided with a sectional conductor extending along the track, the combination with an alternating current dynamo, carried by a train, supplying current to said conductor, the main circuit being closed through said conductor, the rails, and the car wheels, of automatic means for testing the condition of the main circuit, comprising a second circuit one terminal of which is constantly in contact with said conductor, and normally inoperative electrical apparatus in said second circuit for indicating a break in the main circuit.

4. In a signaling system for railways provided with a sectional conductor extending along the track, the combination with an alternating current dynamo carried by a train supplying current to said conductor, the main circuit being closed through said conductor, the rails and the car wheels, of electrical apparatus for automatically indicating the condition of said circuit, comprising a second circuit from the brushes of said dynamo and including said conductor, a magnet in said circuit provided with a pivoted armature and a third circuit closed through a bell by the movement of said armature when the main circuit is broken.

5. In a signaling system for railways, the combination of a sectional conductor extending along the track, an alternating current generator in the circuit of said conductor, a train, signaling apparatus in the main circuit located on the train and operated by alternating currents, a second circuit on the train, and means in said second circuit for automatically indicating the condition of the main circuit.

In witness whereof I have hereunto set my hand this 29th day of August, 1894.

GEORGE E. MILLER.

Witnesses:
LOUIS E. G. GREEN,
GEORGE T. CUNNINGHAM.